Oct. 6, 1959     B. BENDER     2,907,115
ADAPTER FOR WHEEL TESTING EQUIPMENT
Filed Oct. 29, 1958     2 Sheets-Sheet 1

INVENTOR.
Baxter Bender
BY
Ezekiel Wolf, Wolf & [illegible]
attys

Oct. 6, 1959   B. BENDER   2,907,115
ADAPTER FOR WHEEL TESTING EQUIPMENT
Filed Oct. 29, 1958   2 Sheets-Sheet 2

INVENTOR.
Baxter Bender
BY

United States Patent Office 2,907,115
Patented Oct. 6, 1959

2,907,115

ADAPTER FOR WHEEL TESTING EQUIPMENT

Baxter Bender, Mineola, N.Y.

Application October 29, 1958, Serial No. 770,371

12 Claims. (Cl. 33—203.18)

This invention relates to automobile testing equipment and more particularly comprises a new and improved adapter, particularly designed for use with magnetic toe-in gages and magnetic camber, caster, and king pin inclination gages.

At the present time, there are several types of gages on the market which are used to measure camber, caster, king pin inclination, and toe-in of the wheels of automobiles. Most of the gages of this variety now in use employ either an electromagnet or a permanent magnet as a means of coupling the gage to the wheel mounting assembly of the automobile. A typical gage of this kind is shown in the Bender et al. Patent No. 2,645,860 issued July 21, 1953.

All of these devices include expensive castings as frames. The castings are formed with a cup-shaped end which houses the permanent magnet used to couple the gage to the wheel mounting assembly. The permanent magnets are ring shaped and have outer faces which are machined normal to the planes of the various levels mounted on the frame. The machined face of the magnet abuts against the machined face of the wheel hub to provide the proper position for the gage. The inner diameter of the annular magnets are intended to be large enough to fit over the hexagonal nuts on the ends of the spindles of the wheel assembly. However, in recent years, the automobile industry has reduced the size of the hexagonal nuts employed to retain the wheel hub on the spindle and therefore, there no longer is any mechanical cooperation between the hexagonal nut and the inner diameter of the annular magnet to retain the gage in place.

Another difficulty in making the magnets of a size to grasp the nuts and form a mechanical coupling between the gage and the wheel mounting assembly is caused by the fact that the washer behind the nut extends beyond the machined end face of the wheel hub. Therefore, because the washer is of greater diameter than the nut, the opening in the magnet must be large enough to receive the washer so that the machined face for the magnet can engage the machined face of the wheel hub. This necessarily prevents the magnet from fitting tightly over the nut.

Although the magnets alone may have adequate strength to hold the gage on the wheel mounting assembly, they often are inadvertently jarred off the hub by someone who walks by the automobile as it is being serviced. When the end of the frame of the gage is jarred, the rather long lever arm between the end of the frame and the magnetic coupling gives rise to a rather considerable force on the magnetic coupling and the coupling is overcome and the gage drops to the ground. Because the frames are cast, they are rather brittle and often break. In addition to the damage done to the frame, the spirit levels are often broken as well, and if not totally destroyed, the repair bills for the gage may run to approximately one-third the initial cost of the instrument.

The primary object of my invention is to provide an adapter which fits into the annular magnet and snugly engages the hexagonal nut on the end of the spindle. By the use of the adapter, I avoid accidental dropping of the gage.

Another object of my invention is to provide an adapter which serves to center the gage on the wheel hub, a feature which is particularly important for toe-in gages.

Still another important object of my invention is to provide an adapter which may be used with virtually all types of magnetic gages now on the market by simply adding shims of different thicknesses to compensate for the difference between the outer diameter of the adapter and the inner diameter of the magnet.

To accomplish these and other objects, my invention includes an adapter, cylindrical in shape, which is adapted to be fit within the annular magnets mounted in the cup-shaped end of the frame of the wheel testing gages. The adapter is provided with a pair of recesses or slots formed on the inner surface of the cylindrical wall. These slots are disposed 180° apart on the inner surface and receive the ends of a cotter pin which extends radially through the hexagonal nut and spindle. Displaced 45° away from the slots are a pair of openings which extend parallel to the axis of the adapter through the annular wall. Pins are mounted in and extend rearwardly out of these openings. Coil springs carried by the pins between the rear surface of the annular wall and the ends of the pin bias the pins to a position wherein they extend an appreciable distance out of the adapter wall. However, these pins may be moved against the bias of the spring to a position wherein they are substantially confined within the frame. The reasons for the relative position of the pins and slots will be described fully in the detailed specification. These and other objects and features of my invention along with its incident and advantages, will be better understood and appreciated from the following detailed description of several embodiments thereof, selected for purposes of illustration and shown in the accompanying drawing in which:

Figure 1:
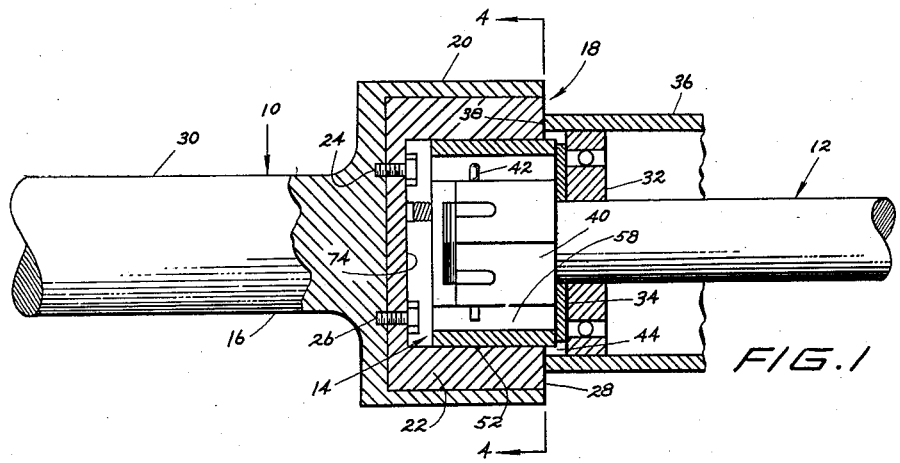
Figure 1 is an elevational view, partly in section, of an adapter constructed in accordance with my invention employed to secure a gage to the end of the wheel mounting assembly.

In Figure 1, I have illustrated a gage 10 which may be of the type shown in the Bender et al. patent supra, used for wheel testing to render measurements of camber, caster, and king pin inclination. The gage 10 is shown mounted on the end of a spindle 12 forming part of the wheel mounting assembly. An adapter 14 is disposed intermediate the gage 10 and the assembly as an aid in coupling the members together and centering the gage on the spindle. Before describing the adapter in detail, additional description will be given of the gage and the wheel mounting assembly to provide a better understanding of the invention.

The gage 10 includes a body 16 having a cup-shaped end 18 cast as part of the frame. The cup-shaped end, having a cylindrical wall 20 houses an annular permanent magnet 22 secured in the cavity of the cup by a pair of machine screws 24 and 26. The outer face 28 of the magnet 22 and more particularly the outer ends of each of the pole pieces 29 is machined so that the face 28 defines a plane exactly normal to the surface 30 of the gage. This surface may carry a number of spirit levels (not shown) to render the desired measurements.

The portion of the wheel mounting assembly shown in Figure 1 includes the spindle 12 on which are mounted bearings 32, a washer 34 and a wheel hub 36. The end face 38 of the wheel hub 36 also is a machined surface and lies in a plane perpendicular to the axis of the spindle 12. A hexagonal castellation nut 40 is threaded on the end of the spindle 12 and retains the bearings and wheel hub in place. As is customary, the wheel hub is secured to the break drum (not shown) and the spindle 12 may be integrally formed with the steering knuckle (not shown). It will be noted in Figure 1 that a cotter pin 42 extends through the end of the spindle and the castellations in the hexagonal nut 40 to lock the nut in place.

It is the universal practice of the automobile industry to assemble the cotter pin in either a vertical or horizontal position. It should be appreciated that the wheel mounting assembly illustrated is a fair representation of the arrangement employed in the current models of automobiles manufactured by General Motors Corporation. Automobiles of the Ford Motor Company include substantially the same arrangement illustrated but include an eight castellation hexagonal nut, rather than the six castellation hexagonal nut by the General Motors Corporation.

To complete the description of the setting of my invention, it is pointed out that when a wheel is mounted on the hub 36, a grease cap (not shown) extends into the recess 44 between the washer 34 and the hub 36. In all of the drawings, the grease cap has been removed as is the case when the tests are made.

It will be appreciated from the description above that the standard gage 10 of the type illustrated, without more, may be mounted substantially as shown without additional components. The annular magnet 22 is of adequate strength to retain the gage in the position shown with the machined face 28 of the magnet bearing against the machined face 38 of the wheel hub. However, it will also be appreciated from the foregoing description, that if a substantial force is exerted against the left end of the gage 10, as viewed in Figure 1, the magnetic attraction of the magnet may be overcome and the gage may fall. Moreover, because the inner diameter of the magnet 22 is substantially greater than the diameter of the hexagonal nut 40, it is extremely difficult if not impossible precisely to center the gage 10 so that its center line is coincident with the axis of the spindle.

Figure 2:
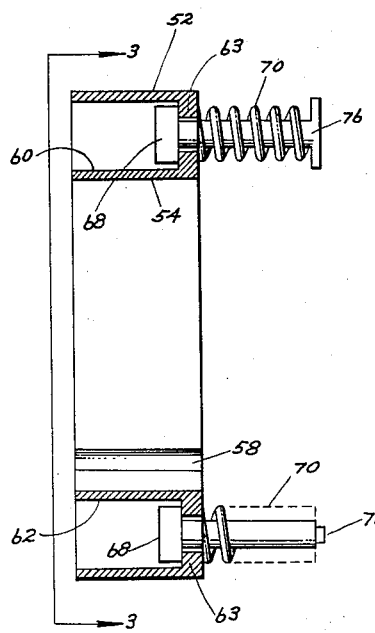
Figure 2 is a cross sectional view of the adapter shown in Figure 1.
Figure 3:
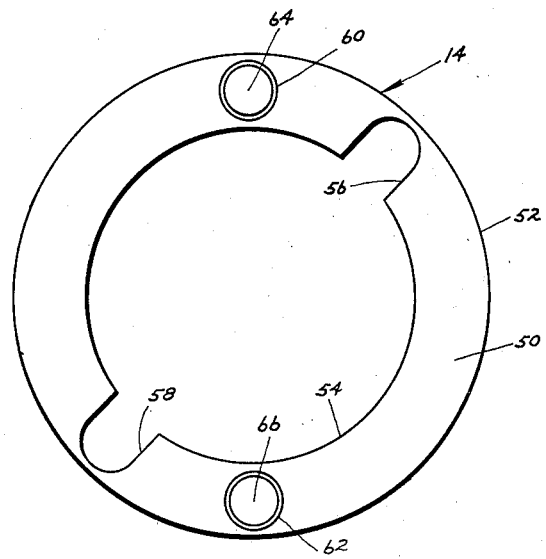
Figure 3 is a plan view of the adapter viewed along the sight line 3—3 in Figure 2.

The adapter 14 shown in detail in Figures 2 and 3 is in the form of an annulus having a cylindrical wall 50 having a smooth uninterrupted outer surface 52 and an inner surface 54. A pair of recesses or slots 56 and 58 are formed in the inner surface 54 of the adapter and extend from the rear to the front face of the annulus. These slots 56 and 58 are disposed 180° apart upon the inner wall 54 and are disposed 45° away from a pair of openings 60 and 62 which extend through the wall 50. The openings 60 and 62 house pins 64 and 66, respectively, and are of a size sufficient to receive the heads 68 of the pins. The pins extend out of the rear ends of the openings 60 and 62 and each carries a coil spring 70. The ends of the pins are flat as suggested in Figure 2 to retain the springs on the pins. The springs 70 act in compression to urge the pin to the right as viewed in Figure 2 so that they extend a maximum distance out of the openings 60 and 62. The heads 68 of the pins are prevented from being drawn out of the rear end of the openings by the flange 63 in the openings.

Figure 4:
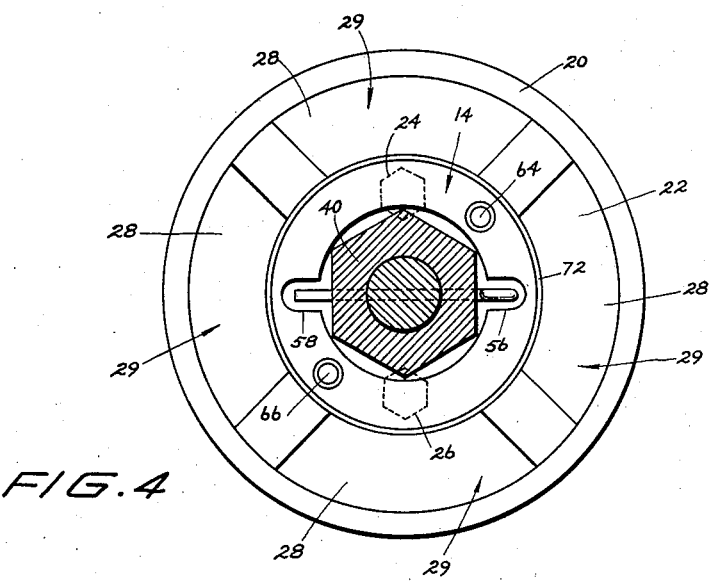
Figure 4 is a cross sectional view taken along the corresponding section line in Figure 1 and shows the addition of a shim or sleeve.

In Figure 1, I have shown the adapter mounted within the magnet 22. Referring to that figure, the reader will note that the outer surface 52 of the adapter 14 engages the inner surface of the annular magnet 22. Ideally, there is a close tolerance between the surfaces so that the adapter will not slide out of the magnet when the cup of the frame 16 is tilted downwardly. If the adapter is appreciably smaller than the opening within the magnet, a shim or sleeve 72 may be employed to provide the proper fit. This arrangement is shown in Figure 4.

The inner diameter of the adapter 14 is just large enough to receive the hexagonal castellated nut 40. As the automobiles of General Motors Corporation and the Ford Motor Company employ the same size hexagonal nuts, the same adapter is suitable for use with automobiles made by either company. The slots 56 and 58 are provided to receive the ends of the cotter pin 42 when the adapter is slipped over the nut 40. The pins 64 and 66 are biased to a position wherein they engage the rear surface 74 of the magnet 22 and urge the adapter over the nut and against the washer 34 in the assembly.

I have stated above that the cotter pins universally are disposed either in a vertical or in a horizontal position through the spindle and nut. It is also the universal practice when machine screws such as at 24 and 26 are employed to retain the magnets in the cup, rather than a press fit relationship, to align the screws vertically as suggested in Figure 1. To avoid interference, between the ends 76 of the pins 64 and 66 with the machine screws 24 and 26, the openings 60 and 62 are displaced 45° from the slots 56 and 58 which receive the ends of the cotter pin. When the pins 64 and 66 are displaced 45° from the slots 56 and 58, regardless of the position of the cotter pin, that is, whether it is in a horizontal or vertical plane, the machine screws will not interfere or abut against the pins 64 and 66 when the adapter is slipped over the nut. It will be appreciated that although the slots are shown displaced 45° from the openings, it is only important that they be displaced other than 90° to avoid interference.

From the foregoing description those skilled in the art will appreciate that by virtue of the fit between the magnets 22 and the adapter 14 as well as between the adapter 14 and the hexagonal nut 40, even a great force applied against the end of the gage 10 will not jar it from its mounting. While the magnet 22 serves to retain the gage in a reference position against the machined surface 38 of the wheel hub 36, the mechanical coupling effected by the adapter between the gage frame and the hexagonal nut will prevent accidental dropping of the gage. Moreover, the adapter 14 will serve to align the gage with the axis of the spindle 12 without the use of centering pins or other expedients which are sometimes found in gages now in use. It is important to recognize that the adapter does not interfere with the basic alignment provided between the machine faces of the magnet and wheel hub.

Figure 5:
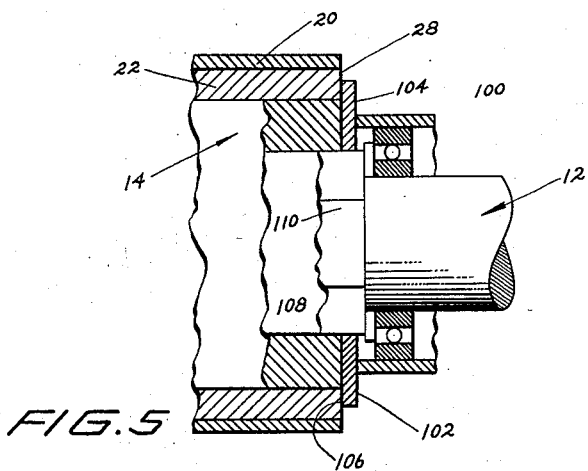
Figure 5 is a cross sectional view similar to Figure 1 but showing the addition of a spacer used in certain applications.

In Figure 5 I have illustrated in a fragmentary view the use of my adapter in a gage used on an automobile of foreign manufacture. In automobiles made abroad, it is not uncommon to find that the wheel hub 100 has a smaller outer diameter than the inner diameter of the magnet 22. This relationship is shown in Figure 5. A spacer 102 in combination with the adapter 14 makes it possible to use existing gages on such automobiles. The spacer 102 is in the form of a disc having a pair of machined faces 104 and 106 and having a central opening 108 of a diameter substantially equal to the greatest diameter of the hexagonal nut 110. The spacer 102 abuts against the machined face 112 of the wheel hub 100 and extends radially beyond it a sufficient distance to lie in the path of the machined face 28 of the magnet. Thus, the spacer serves as an intermediate member between the two machined faces when the gage is mounted on the assembly. Of course, the use of such a spacer adversely affects the efficiency of the magnet so that it has a reduced magnetic attraction with the wheel hub. Thus, my adapter 14 assumes even greater importance. The adapter 14 serves to engage the hexagonal nut 110 and provides the firm mechanical coupling between the gage and the wheel mounting assembly.

From the foregoing description, those skilled in the art will appreciate that my adapter has many applications. It may be used on virtually all types of wheel testing equipment. The adapter may be made inexpensively either from tubing extruded with or without the slots, or may be made on screw machines from bar stock. There are virtually no limitations on the materials which may be used. The adapter may be made either of magnetic or nonmagnetic material as desired. Certain advantages may be derived from making the adapter out of ferromagnetic material. For example, because the face 28 of the magnet is the attracting surface, the adapter when made of such material will be attracted in that direction and this action may supplement the action of the spring loaded pins to urge the adapter against the face of the washer. Furthermore, the adapter will not readily fall out of the magnet even though there is not a close fit between the inner surface of the magnet and the outer surface of the ring. It should also be appreciated that great sums of money have been expended by gage manufactures to strengthen the magnets used in an effort to increase the strength of the coupling between the gage and wheel hub. The strengthening of the magnets obviously adversely affect the cost of the gages. Nevertheless, my adapter used in combination with even a relatively weak magnet provides a stronger bond between the gage and wheel mounting assembly than the strongest magnets contemplated for use in the gages, without the adapter.

Because numerous modifications may be made of my invention without departing from its spirit, I do not intend to limit the breadth of my invention to the specific embodiments illustrated and described. Rather, it is my intention that the breadth of my invention be determined by the appended claims and their equivalents.

I claim:

1. In combination with a wheel testing device having a cup-shaped recess formed in its frame and an annular magnet mounted in the recess; an adapter for securing the testing device to the spindle of an automobile wheel assembly comprising a cylindrical wall having a smooth outer surface adapted to engage the inner surface of the annular magnet, at least one pin slidably secured in the wall, means biasing the pin out of the wall into engagement with the rear wall of the cup-shaped recess, whereby the cylindrical wall is urged forward in the recess, and a pair of slots formed in the inner surface of the cylindrical wall, said slots being disposed 180° apart and extending parallel to the axis of the cylindrical wall.

2. In combination with a wheel testing device having a cup-shaped recess formed in one end of its frame and an annular magnet secured in the recess of the frame; an adapter for securing the testing device on a nut screwed to the end of a spindle of a wheel mounting assembly comprising a cylindrical wall mounted in the recess with the outer surface of the wall engaging the inner surface of the annular magnet, means including a spring biasing the wall toward the open end of the recess, the inner diameter of the cylindrical wall being substantially equal to the greatest diameter of the nut and adapted to receive said nut, and a pair of slots formed in the inner surface of the cylindrical wall and adapted to receive the ends of a cotter pin extending through the nut and spindle when the nut lies within the wall.

3. An adapter for securing a wheel testing device having a cup-shaped recess formed in its frame and an annular magnet disposed in the cup-shaped recess and secured to the frame to a wheel mounting assembly including a spindle, a wheel hub surrounding the spindle, a nut screwed on the end of the spindle, and a cotter pin extending radially through the nut and spindle comprising a cylindrical wall adapted to be mounted co-axially with and inside the annular magnet, the annular wall having an inner diameter substantially equal to the greatest diameter of the nut whereby the nut may be inserted within the wall, spring means secured to the wall for urging the wall toward the open end of the cup-shaped recess and over the nut, and slots formed on the inner surface of the annular wall and adapted to receive the ends of the cotter pin when the nut lies within the wall.

4. An adapter comprising a cylindrical wall having a smooth outer surface, a pair of grooves in the inner surface of the wall and extending parallel to the axis of the cylindrical wall, said grooves being disposed opposite one another in said inner surface, a pair of openings extending through the wall parallel to the axis of the cylindrical wall, pins slidably mounted in and extending out one end of each of the openings and having enlarged heads disposed in the openings, coil springs mounted on each of the pins outside the openings, and means formed on the ends of the pins outside the openings for retaining the springs on the pins.

5. A device as defined in claim 4 further characterized by said openings being displaced from the slots an angle less than 90°.

6. A device as defined in claim 4 further characterized by said openings being disposed opposite one another in the wall and displaced 45° from the slots.

7. An adapter comprising a cylindrical wall having a smooth outer surface, a pair of grooves in the inner surface of the wall and extending parallel to the axis of the cylindrical wall, said grooves being disposed opposite one another on said inner surface, at least one opening extending through the wall parallel to the axis of the cylindrical wall, a pin slidably mounted in and extending out one end of the opening and having an enlarged head retained in the opening, and means engaging the pin biasing the pin out of the opening.

8. An adapter for securing a wheel testing device to a wheel mounting assembly wherein the testing device includes a frame haivng a cup-shaped recess formed at one end, and an annular magnet disposed in the recess and having a machined face facing out of the recess, and wherein the wheel mounting assembly includes a spindle, a wheel hub secured to and surrounding the spindle and having a machined end face facing in the direction of the outer end of the spindle, said machined end face having a smaller outer diameter than the inner diameter of the annular magnet, and a nut screwed to the outer end of the spindle, comprising a round flat spacer having parallel machined end faces, an opening extending through the spacer with a diameter substantially equal to the greatest diameter of the nut and adapted to extend over said nut, said spacer having an outer diameter greater than the inner diameter of the annular magnet, a cylindrical wall mounted in the recess of the frame with its outer surface engaging the inner surface of the magnet, the inner diameter of the wall being substantially equal to the greatest diameter of the nut and adapted to receive the nut, and means for urging the wall toward the opening of the recess and over the nut when the machined faces of the magnet and wheel hub abut against the machined faces of the spacer.

9. An assembly as defined in claim 8 further characterized by the wheel mounting assembly including a cotter pin extending radially through the spindle and the nut, and slots formed in the inner surface of the annular wall and adapted to receive the ends of the cotter pin.

10. An assembly as defined in claim 8 further characterized by the force urging the wall over the nut being less than the magnetic attraction between the magnet, spacer, and wheel hub.

11. An adapter for securing a wheel testing device to a wheel mounting assembly wherein the testing device includes a frame having a cup-shaped recess formed at one end, and an annular magnet disposed in the recess and having a machined face facing out of the recess, and wherein the wheel mounting assembly includes a spindle, a wheel hub secured to the spindle and having a machined end face facing in the direction of the outer end of the spindle, and a nut screwed to the outer end of the spindle, said machined faces of the magnet and the wheel hub adapted to engage one another and be held together by the magnetic attraction of the magnet when the axis of the magnet is aligned with the axis of the spindle, comprising a cylindrical wall mounted in the recess of the frame with its outer surface disposed adjacent the inner surface of the magnet, the inner diameter of the wall being substantially equal to the greatest diameter of the nut and adapted to receive the nut, and means for urging the wall toward the opening of the recess and over the nut when the machined faces of the wheel hub and magnet abut one another.

12. An assembly as defined in claim 11 further characterized by the means urging the wall toward the opening of the recess and over the nut applying a force less than the force of the magnet.

No references cited.